(12) United States Patent
Rusu

(10) Patent No.: US 6,290,441 B1
(45) Date of Patent: Sep. 18, 2001

(54) STAKE POCKET TIE DOWN

(75) Inventor: William Rusu, West Bloomfield, MI (US)

(73) Assignee: The Budd Company, Troy, MI (US)

( * ) Notice: Subject to any disclaimer, the term of this patent is extended or adjusted under 35 U.S.C. 154(b) by 0 days.

(21) Appl. No.: 09/539,562

(22) Filed: Mar. 31, 2000

(51) Int. Cl.$^7$ .................................................. B60P 7/08
(52) U.S. Cl. ........................ 410/106; 410/102; 410/110; 410/116; 296/100.07
(58) Field of Search .................................. 410/101, 102, 410/106, 110, 116; 296/100.07, 43; 24/115 K; 248/499

(56) References Cited

U.S. PATENT DOCUMENTS

| | | | |
|---|---|---|---|
| 3,259,353 | * 7/1966 | Webb | 410/116 |
| 3,381,925 | 5/1968 | Higuchi . | |
| 3,421,726 | 1/1969 | Getter . | |
| 3,595,125 | 7/1971 | Jacobs . | |
| 3,788,684 | 1/1974 | Johnson et al. . | |
| 3,950,010 | * 4/1976 | Robertson | 410/110 |
| 4,191,108 | 3/1980 | Jones | 410/110 |
| 4,607,991 | 8/1986 | Porter | 410/110 |
| 4,657,299 | 4/1987 | Mahan . | |
| 4,762,449 | 8/1988 | St. Pierre et al. | 410/107 |
| 4,820,094 | * 4/1989 | Hirakui et al. | 410/110 X |
| 4,948,311 | 8/1990 | St. Pierre et al. | 410/107 |
| 4,958,875 | 9/1990 | Zamzow . | |
| 5,141,277 | 8/1992 | Alexander . | |
| 5,180,263 | * 1/1993 | Flowers, Jr. | 410/106 |
| 5,316,357 | 5/1994 | Schroeder . | |
| 5,326,203 | 7/1994 | Cockrell | 410/110 |
| 5,443,341 | * 8/1995 | Hamilton | 410/116 |
| 5,484,240 | 1/1996 | Rosenberg | 410/110 |
| 5,556,156 | 9/1996 | Kirk . | |
| 5,560,666 | 10/1996 | Vieira et al. . | |
| 5,738,471 | * 4/1998 | Zentner et al. | 410/110 |
| 5,915,900 | * 6/1999 | Boltz | 410/110 |
| 6,109,681 | * 8/2000 | Edwards et al. | 296/100.07 X |
| 6,139,235 | * 10/2000 | Vander Koy et al. | 410/101 X |

\* cited by examiner

Primary Examiner—Stephen T. Gordon
(74) Attorney, Agent, or Firm—Harness, Dickey & Pierce, P.L.C.

(57) ABSTRACT

A stake pocket tie down for a motor vehicle having a cargo area defined by a first sidewall, a second sidewall, a bed and a tailgate is disclosed. The first sidewall has a stake pocket defined by a top surface and a downwardly extending flange. The stake pocket tie down includes a cap, a first locking plate and a second locking plate. The cap has a wall with a first aperture and a second aperture and a flange radially extending from the wall. The first locking plate has male clasp and a finger disposed in the first aperture. The second locking plate has female clasp engaged with the male clasp and a finger disposed in the second aperture.

8 Claims, 3 Drawing Sheets

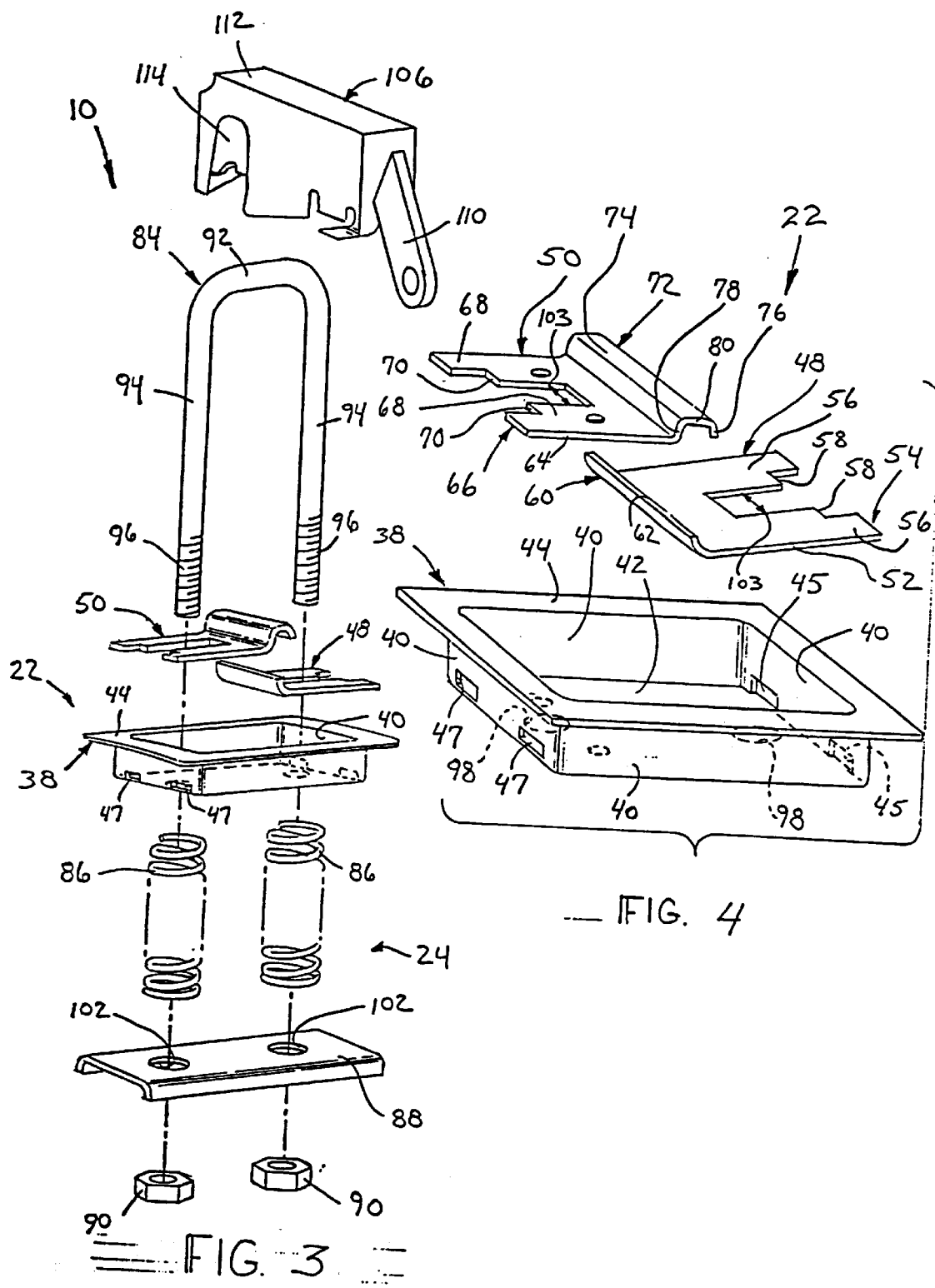

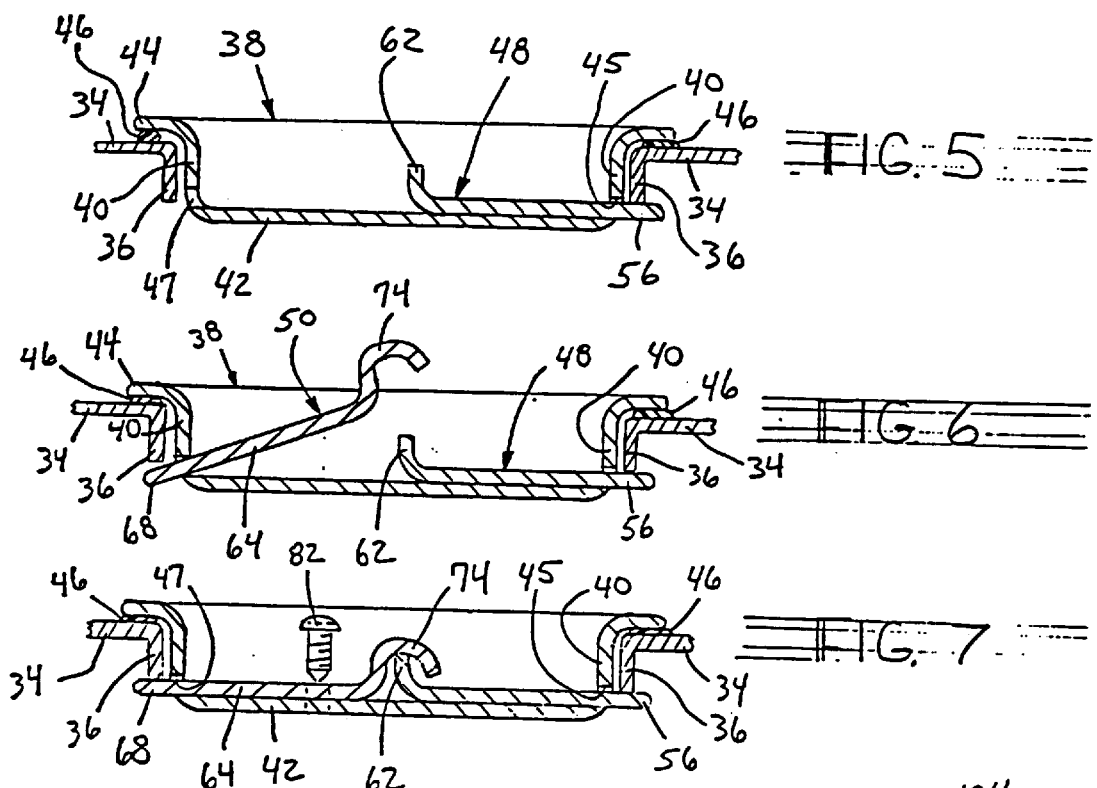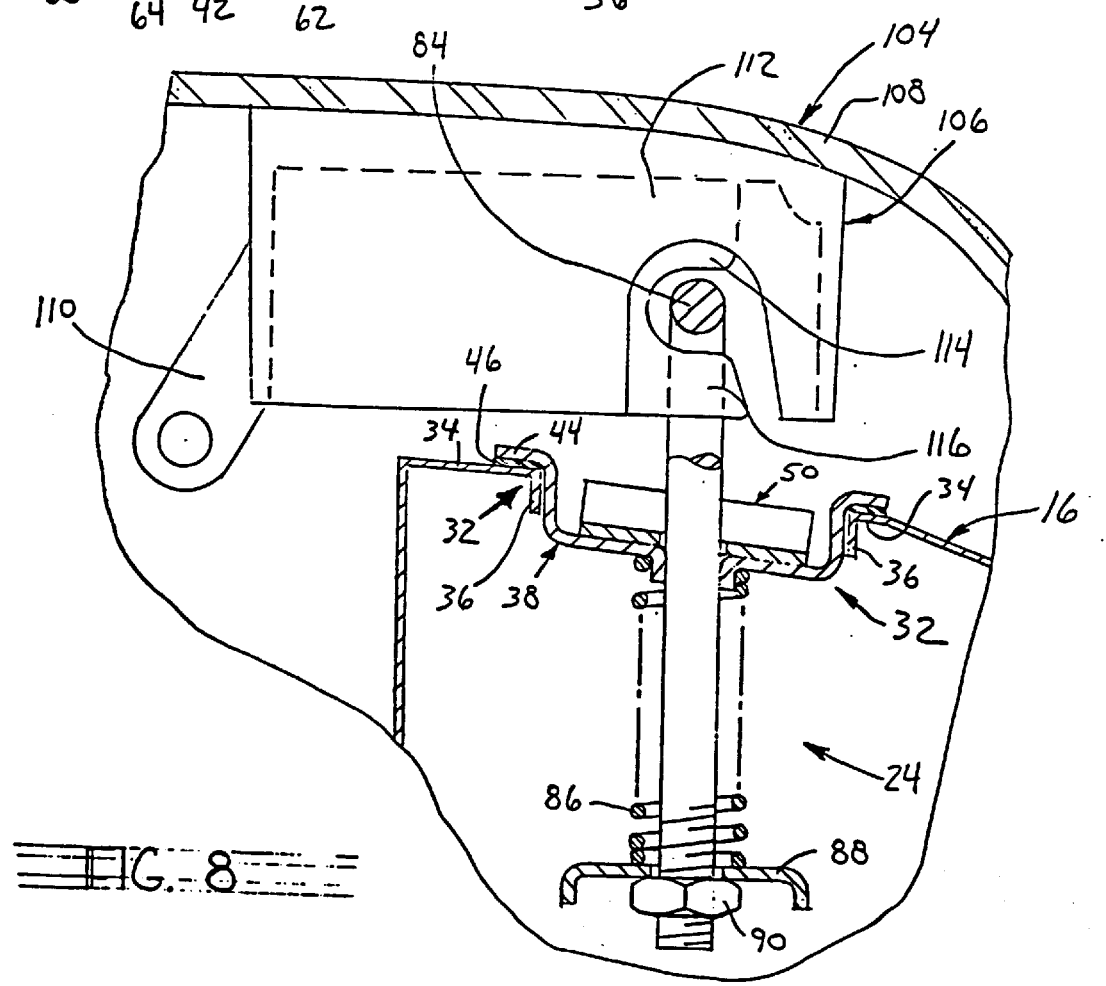

STAKE POCKET TIE DOWN

TECHNICAL FIELD

The present invention relates to a tie down for securing cargo within the bed of a motor vehicle. More particularly, the present invention relates to a tie down removably mounted within the stake pocket of a pick up truck.

DISCUSSION

The use of a cargo carrying vehicle such as a pick up truck often times involves the need to secure cargo in place. In addition, it is often advantageous to cover the open bed area of a pick up truck with a tonneau cover, camper top or other similar device. Accordingly, operators of pick up trucks and other cargo carrying vehicles commonly utilize tie downs fixed around the perimeter of the truck bed to provide anchorages for securing the cargo located within the vehicle bed.

One type of tie down provides a hook or cleat type anchorage which is fastened to the vehicle sidewall by screws or other threaded fasteners. In order to attach this type of tie down to the vehicle, additional fastener apertures must be drilled or punched through the vehicle sidewall. The drilling of the special fastener apertures is not only tedious and time consuming, but very likely detracts from the aesthetic appeal and resale value of the vehicle. Furthermore, access to both sides of the vehicle sidewall may be limited thereby impeding attachment using a standard bolt and nut.

Another type of tie down such as the one disclosed in U.S. Pat. No. 4,762,449 provides an anchorage at the stake pocket found in pick up truck models. While these tie downs do not require the drilling of additional fastener apertures, they have certain disadvantages. In some cases, the tie down structure includes a lower plate that must be specifically sized for insertion within the stake pocket. Because the stake pocket is a blind aperture, the tie down must be articulated in order for the lower plate to enter the stake pocket opening and subsequently be long enough to engage the vehicle sidewalls. Accordingly, many different assembly levels may be required to retrofit a wide variety of vehicles. In other cases, the device provides only a rigid anchorage to the vehicle sidewall without any shock absorbing provision for rough road use. Therefore, composite structures such as bed caps and tonneau covers may prematurely fail due to impact loading.

SUMMARY OF THE INVENTION

It is therefore an object of the present invention to provide a stake pocket tie down which may be removably fitted to a pick up truck sidewall without drilling or cutting the sidewall.

It is another object of the present invention to provide a stake pocket tie down having a shock absorber or damper anchorage for releasably coupling a tonneau cover or top.

It is another object of the present invention to provide a tonneau cover latch releasably engagable with the stake pocket tie down of the present invention.

The present invention includes a stake pocket tie down for a motor vehicle having a cargo area defined by a first sidewall, a second sidewall, a bed and a tailgate. The first sidewall has a stake pocket defined by a top surface and a downwardly extending flange. The stake pocket tie down includes a cap, a first locking plate, a second locking plate and a fastener. The cap has a wall with a first aperture and a second aperture and a flange radially extending from the wall. The first locking plate has male clasp and a finger disposed in the first aperture. The second locking plate has female clasp engaged with the male clasp and a finger disposed in the second aperture. The fastener interconnects the second locking plate and the cap.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 3 is an exploded perspective view of the stake pocket tie down constructed in accordance with the teachings of the present invention;

FIG. 4 is an exploded perspective view of the coupling mechanism of the present invention;

FIG. 5 is a partial sectional view similar to FIG. 2 depicting an initial assembly stage of the present invention;

FIG. 6 is a partial sectional view similar to FIG. 2 depicting an intermediate assembly stage of the present invention;

FIG. 7 is a partial sectional view similar to FIG. 2 depicting a final assembly stage of the present invention; and FIG. 8 is a sectional view of the stake pocket tie down illustrating installation to a vehicle taken along the line 8—8 of FIG. 1.

DETAILED DESCRIPTION OF THE PREFERRED EMBODIMENTS

Figure 1:
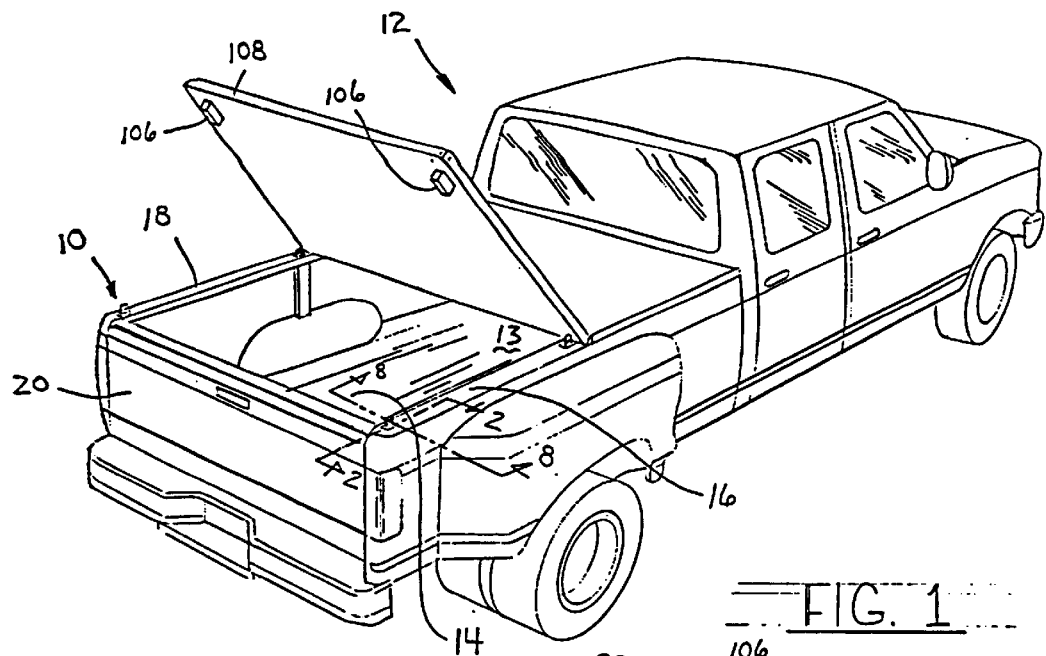
FIG. 1 is a perspective view of a motor vehicle equipped with an embodiment of the stake pocket tie down of the present invention.

With reference to FIG. 1, a stake pocket tie down constructed in accordance with the teachings of an embodiment of the present invention is generally identified at reference numeral 10. The stake pocket tie down 10 is shown operatively associated with an exemplary motor vehicle 12. In the preferred embodiment, the vehicle 12 is a pick up truck having a cargo area 13 defined by a bed 14, a first sidewall 16, a second sidewall 18 and a tailgate 20.

Figure 2:
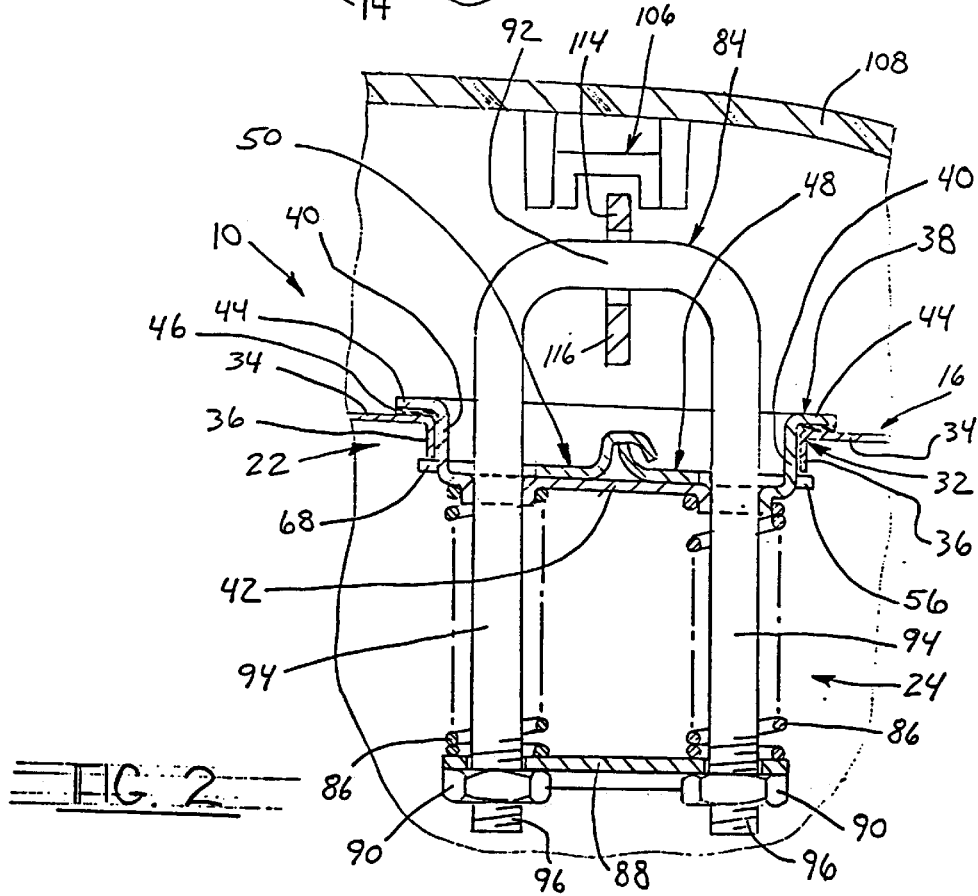
FIG. 2 is a sectional view taken along the line 2—2 of FIG. 1.

Referring to FIGS. 2 and 3, the stake pocket tie down 10 is illustrated to generally include a coupling mechanism 22 for detachably interconnecting the stake pocket tie down 10 with the first sidewall 16 without the addition of fastener apertures in the vehicle sidewall. The stake pocket tie down 10 also includes a damper mechanism 24 for providing a biasedly loaded anchorage for securing cargo. In addition, the stake pocket tie down 10 provides a tonneau cover attachment point as described in greater detail hereinafter.

The coupling mechanism 22 engages a portion of the first sidewall 16 commonly known as a stake pocket 32. The stake pocket 32 is defined by a top rail 34 and downwardly extending flanges 36. As shown in FIG. 4, the coupling mechanism 22 includes a cap 38 having four vertical sidewalls 40 interconnected by a pan 42. The cap 38 further includes a flange 44 extending radially from each of the vertical sidewalls 40. One skilled in the art will appreciate that the pan 42 and the vertical sidewalls 40 are sized such that the cap 38 may be inserted within the stake pocket 32 until the flange 44 contacts the top rail 34 of the first sidewall 16. The cap 38 also includes two pair of transversely aligned slots 45 and 47, respectively, extending through two of the opposing vertical sidewalls 40.

The coupling mechanism 22 further includes a first locking plate 48 and a second locking plate 50 for interconnecting the stake pocket tie down and the first sidewall 16. The first locking plate 48 includes a generally planar body 52 having a bifurcated first end 54 with a pair of substantially parallel fingers 56. Each of the fingers 56 includes a detent 58 for limiting the axial travel of the fingers 56 through the first pair of slots 45. A second end 60 of the first locking plate 48 includes a male clasp 62 laterally extending from the body 52. In similar fashion, the second locking plate 50 includes a generally planar body 64 having a bifurcated first end 66 with substantially parallel fingers 68. Each of the fingers 68 includes a detent 70 for engagement with one of the vertical sidewalls 40 of the cap 38 thereby limiting the distance in which the fingers 68 may be inserted into the second pair of slots 47. A second end 72 of the body 64 includes a female clasp 74 for receiving the male clasp 62 of the first locking plate 48. The female clasp 74 includes a generally C-shaped channel having a first panel 76 and a second panel 78 interconnected by an end panel 80.

As best seen in FIGS. 5–7, the coupling mechanism 22 releasably couples the stake pocket tie down 10 to the first sidewall 16 by sandwiching the top rail 34 between the flange 44 of the cap 38 and the fingers 56 and 68 of the first and second locking plates, respectively. Specifically, the cap 38 is positioned within the stake pocket 32 with a resilient seal 46 positioned between the flange 44 and the top rail 34. One skilled in the art will appreciate that a resilient seal 46 is positioned between the flange 44 and the top rail 34 to protect the painted finish of the top rail and also provide a retention function as will be described in detail hereinafter.

To continue the interconnection of the stake pocket tie down 10 and the vehicle 12, the first locking plate 48 is inserted through the first pair of slots 45 as the seal 46 is being compressed as shown in FIG. 5. One skilled in the art will appreciate that the vertical sidewalls 40 of the cap 38 are sized such that the fingers 56 may not pass by the downwardly extending flange 36 until the seal 46 is compressed. Once the fingers 56 have been inserted until the detent 58 engages the vertical sidewall 40, the second locking plate 50 may be installed.

With reference to FIG. 6, the second locking plate 50 is positioned at an acute angle relative to the top rail 34 such that the body 64 clears the male clasp 62 of the first locking plate 48. The remaining portion of the seal 46 is compressed as the fingers 68 of the second locking plate 50 pass through the second pair of slots 47 and beneath the downwardly extending flange 36. Once the fingers 68 have been inserted to the point where the detents 70 engage the vertical sidewall 40, the second locking plate 50 is rotated such that the female clasp 74 engages with the male clasp 62. Assembly of the coupling mechanism 22 is completed by interconnecting the second locking plate 50 to the pan 42 of the cap 38 with a fastener 82 as shown in FIG. 7.

With reference to FIGS. 2 and 3, the stake pocket tie down 10 also includes a damper mechanism 24 for providing an anchorage equipped with a damping or shock absorbing system. The damper mechanism 24 includes a generally U-shaped striker 84, a pair of helical springs 86 an adjustment plate 88 and a pair of adjustment nuts 90 for securing the striker 84 to the adjustment plate 88. The striker 84 includes a center portion 92 disposed between two substantially parallel downwardly extending legs 94. Each of the downwardly extending legs 94 includes an external thread 96 positioned on a portion thereof. The pair of helical springs 86 are positioned about each of the downwardly extending legs 94. In addition, each of the downwardly extending legs 94 protrudes through an aperture 98 located in the pan 42 of the cap 38. The adjustment plate 88 includes a pair of apertures 102 for receipt of the downwardly extending legs 94 of the striker 84. The adjustment nuts 90 complete the damper mechanism 24 by operatively interconnecting the damper mechanism 24 with the coupling mechanism 22. One skilled in the art will appreciate that the adjustment nuts 90 act in cooperation with the adjustment plate 88 to form a preload mechanism capable of compressing the helical springs 86 to a desired preload by simply rotating the adjustment nuts.

Installation of the stake pocket tie down 10 is preferably accomplished by first assembling the damper mechanism 24 to the cap 38. This order of operations is suggested because, as earlier mentioned, the stake pocket 32 is a blind hole and an operator would not have access to the adjustment nuts 90 after the cap 38 is placed within the stake pocket 32. It should be appreciated that each pair of fingers 56 and 68 are spaced apart a distance 103 to accommodate the downwardly extending legs 94 of the striker 84. Accordingly, once the cap and damper mechanism subassembly has been inserted into the stake pocket 32, the locking plates 48 and 50 of the coupling mechanism 22 may be installed and secured to the vehicle sidewall as earlier mentioned. At this time, an operator of the vehicle 12 may utilize the stake pocket tie down 10 as an anchorage for securing cargo.

Referring to FIGS. 1 and 8, a tonneau cover assembly 104 of the present invention provides a removable enclosure for the cargo area 13. The tonneau cover assembly 104 includes a latch 106 for selectively interconnecting a cover 108 and the stake pocket tie down 10. Specifically, the latch 106 includes a release mechanism 110 for selectively switching the latch 106 from a locked mode to an open mode. The latch 106 includes a housing 112 and a roll cam 114. In the preferred embodiment, the latch 110 is of the mini-rotary slam latch type. Accordingly, the roll cam 114 functions by rotating about the striker 84 as the cover 108 is closed. The roll cam 114 includes a hook 116 for engaging the striker 84 when the latch 106 is in the locked mode. Once the latch 106 is in the locked mode, the damper mechanism 24 acts as a shock absorber between the cover 108 and the first sidewall 16 thereby reducing any impact loading that may occur while driving over rough terrain. In addition, the cover 108 will be less likely to vibrate or rattle as the vehicle 12 is operated.

To release the latch 106 and access the cargo area 13, an operator simply actuates the release mechanism 110 to rotate the hook 116 out of engagement with the striker 84 thereby switching the latch 106 into the open mode. After the latch 106 is in the open mode, the operator may lift the cover 108 as desired.

Therefore, it should be appreciated that the configuration and operation of the stake pocket tie down 10 provides a variety of advantages over the prior art. Specifically, the coupling mechanism of the present invention reduces the time required to assemble the tie down to the vehicle by eliminating the need for drilled mounting holes. Additionally, the stake pocket tie down includes a damper mechanism for absorbing road load inputs thereby preventing damage to accessories such as tonneau covers.

The foregoing discussion discloses and describes merely exemplary embodiments of the present invention. One skilled in the art will readily recognize from such discussion, and from the accompanying drawings and claims, that various changes, modifications and variations may be made therein without department from the spirit and scope of the invention as defined in the following claims.

What is claimed is:

1. A stake pocket tie down for a motor vehicle having a cargo area defined by a first sidewall, a second sidewall, a bed and a tailgate, the first sidewall having a stake pocket defined by a top surface and a downwardly extending flange, the stake pocket tie down comprising:

a cap having a wall and a flange outwardly extending from said wall, said wall including a first aperture and a second aperture;

a first locking plate having a finger disposed in said first aperture, said first locking plate including a male clasp; and a second locking plate having a finger disposed in said second aperture, said second locking plate including a female clasp engaged with said male clasp.

2. The stake pocket tie down of claim 1 further including a damper mechanism operatively interconnecting a striker and said cap.

3. The stake pocket tie down of claim 2 wherein said striker is slidably disposed within an aperture of said cap.

4. The stake pocket tie down of claim 3 wherein each of said first and second locking plates includes a second finger thereby defining a pair of spaced apart fingers, said striker disposed between each pair of spaced apart fingers.

5. The stake pocket tie down of claim 4 wherein said second locking plate includes an aperture for receipt of a fastener for coupling said second locking plate to said cap.

6. The stake pocket tie down of claim 5 wherein at least one of said fingers of said first and second locking plates includes a detent to limit the travel of said fingers through said first and second apertures.

7. The stake pocket tie down of claim 6 wherein said fingers are adapted to engage the downwardly extending flange.

8. The stake pocket tie down of claim 7 wherein said cap flange and fingers are adapted to sandwich the downwardly extending flange of the first sidewall.

* * * * *